April 8, 1952  E. J. SAXL  2,591,724
TENSION METER
Filed Oct. 24, 1945  4 Sheets-Sheet 1
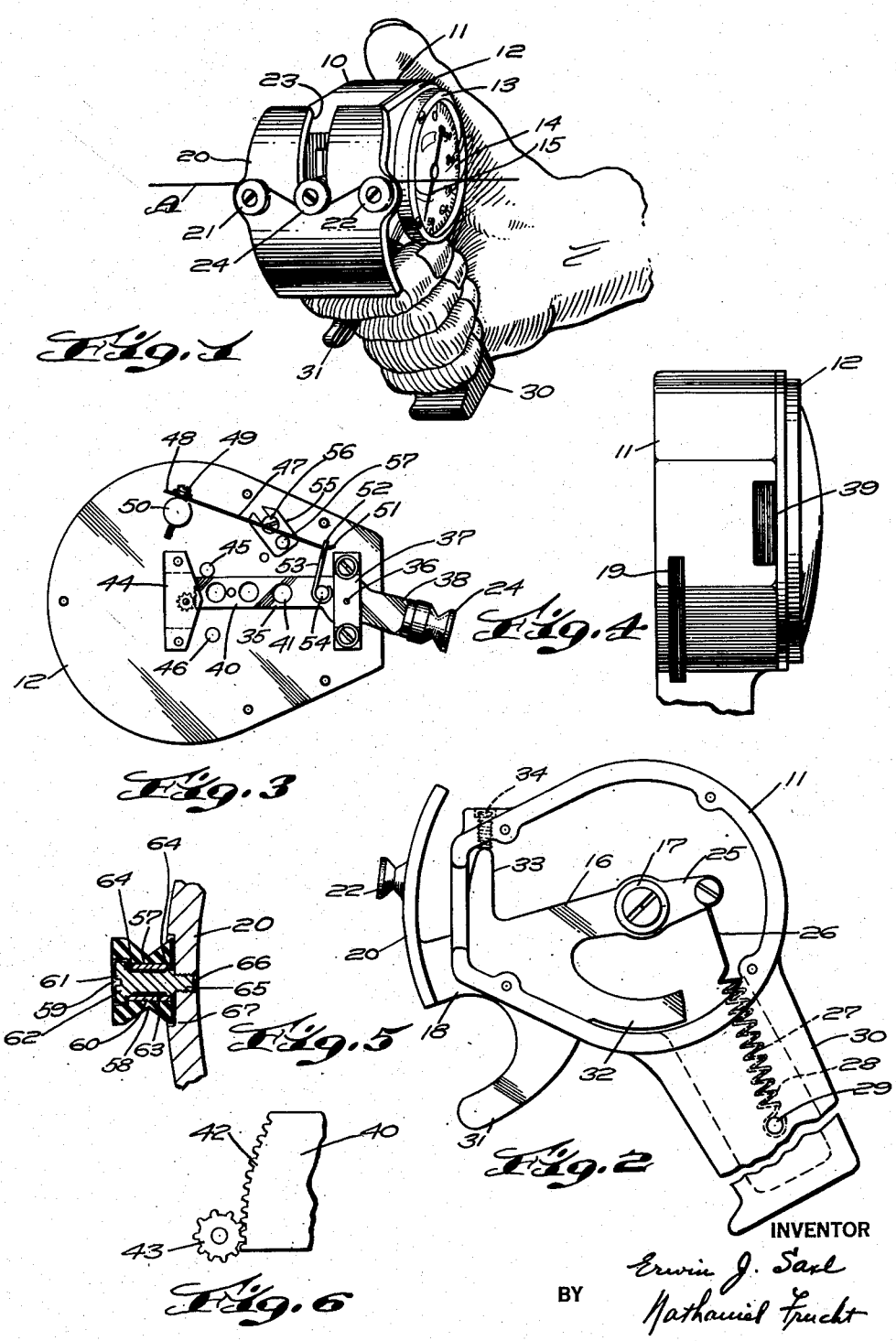

April 8, 1952 E. J. SAXL 2,591,724
TENSION METER

Filed Oct. 24, 1945 4 Sheets-Sheet 2

INVENTOR
Erwin J. Saxl
BY Nathaniel Frucht
ATTORNEY

April 8, 1952     E. J. SAXL     2,591,724
TENSION METER
Filed Oct. 24, 1945     4 Sheets-Sheet 3
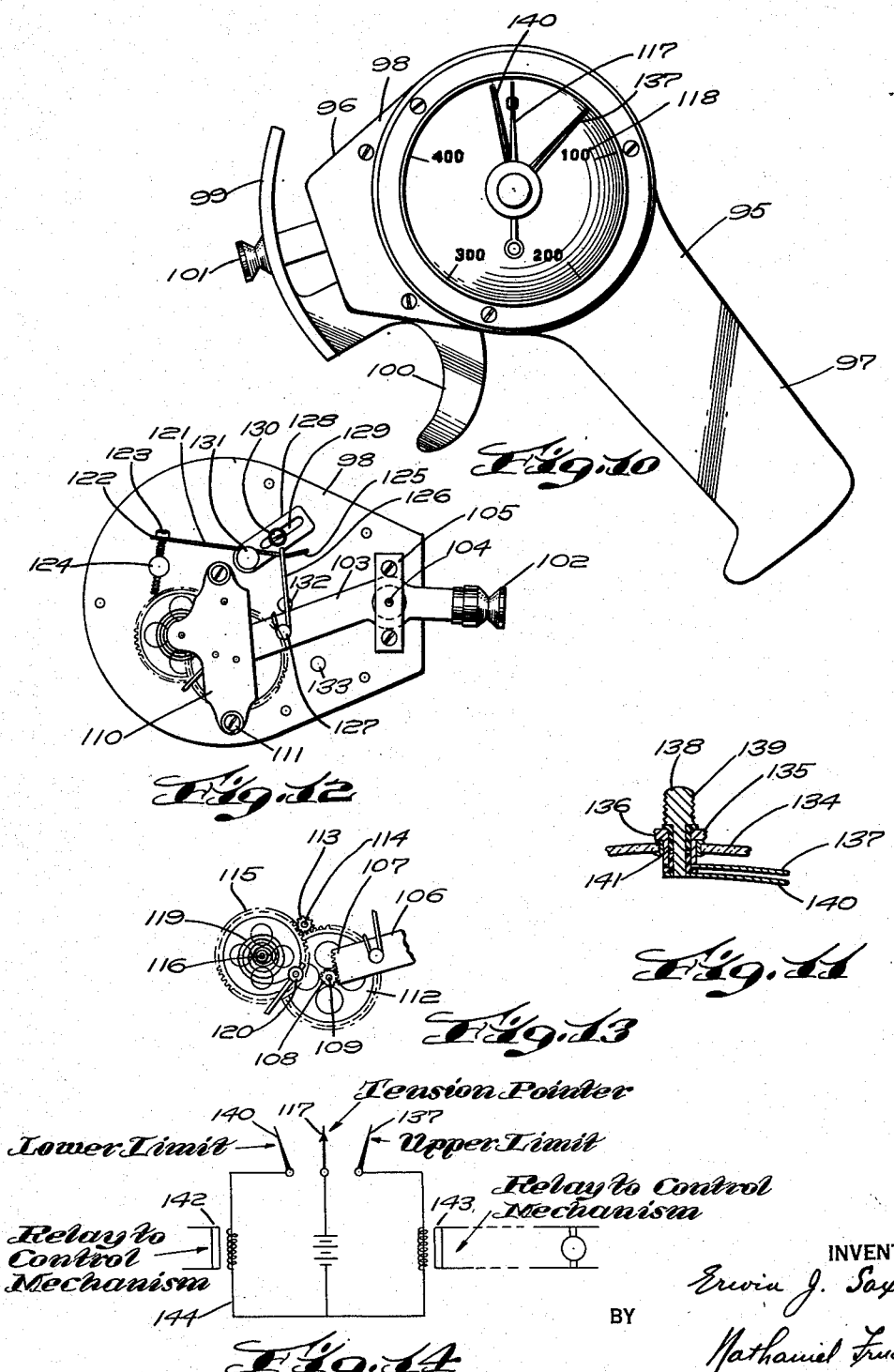
INVENTOR
Erwin J. Saxl
BY Nathaniel Frucht
ATTORNEY April 8, 1952 E. J. SAXL 2,591,724
TENSION METER Filed Oct. 24, 1945 4 Sheets-Sheet 4

INVENTOR
Erwin J. Saxl
BY
Nathaniel Frucht
ATTORNEY

Patented Apr. 8, 1952

2,591,724

UNITED STATES PATENT OFFICE 2,591,724

TENSION METER

Erwin J. Saxl, Providence, R. I.

Application October 24, 1945, Serial No. 624,257

11 Claims. (Cl. 73—144)

The present invention relates to tension meter constructions of the portable type, and has particular reference to devices for measuring the textile yarns, wires, and similar materials of filamentous form.

The principal object of the invention is to provide a simple, accurate tension meter for determining the tension of yarns, cords, wires and similar linear elements.

Another object of the invention is to provide a portable tension meter which may be readily applied to a stationary or linearly moving element under tension.

Still another object is to provide a tension meter which is quickly engageable with a linear element under tension.

A further object is to provide a tension meter construction which is sealed against entry of acids, dust, lint and other extraneous materials which might affect the accuracy of the tension determination.

With the above and other objects and advantageous features in view, the invention consists of a novel arrangement of parts more fully disclosed in the detailed description following, in conjunction with the accompanying drawings illustrating preferred constructions, and more specifically defined in the claims appended thereto.

In the drawings:

Fig. 1 is a perspective view showing the tension meter applied to a textile yarn;

Fig. 2 is a view of the meter, partly broken away, the cover being removed;

Fig. 3 is a view of the back of the cover;

Fig. 4 is a side view of the meter casing, parts being broken away and other parts being removed to show the casing slots;

Fig. 5 is an enlarged sectional detail of one yarn roller;

Fig. 6 is an enlarged detail of the meter gearing connection;

Fig. 10 is a side view of a modified construction of tension meter;

Fig. 11 is a sectional detail of the limit setting mechanism;

Fig. 12 is a view of the cover of Fig. 10;

Fig. 13 is a detail of Fig. 12 showing the gearing arrangement;

Fig. 14 is a diagrammatic view showing an application of the construction of Fig. 10 for controlling operating mechanism;

Figure 7:
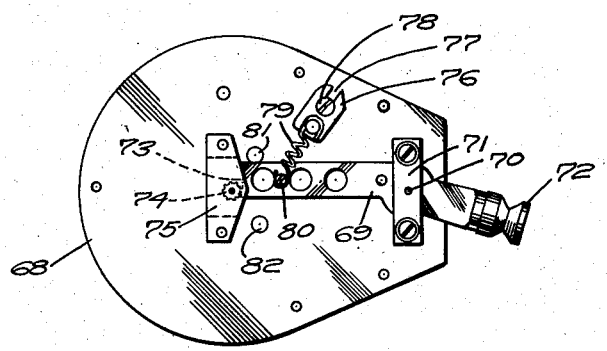
Fig. 7 is a view similar to Fig. 3, showing a modified meter operating mechanism.

I have found a growing demand, particularly in the textile industry, for a portable tension meter which can quickly and accurately measure the tension in a yarn, cord, or the like. I have therefore devised a simple arrangement to meet this demand, the novel device comprising relatively movable rollers which are arranged so that the amount of tension in a yarn, cord or similar linear element is indicated on an indicating dial. I have further simplified the construction and facilitated the application and use of the tension meter by providing a trigger control and positive guides for the linear element, and by protecting the operating mechanism against the entry of extraneous materials such as acids, dust, lint and the like.

The tension meter mechanism

Referring to the drawings, which show illustrative constructions embodying the invention, the tension meter 10, see Fig. 1, includes a casing 11 for housing the operating mechanism, provided with a detachable cover 12 on which a tension indicator 13 is mounted. The tension indicator includes tension indicia 14 and a movable pointer 15.

As shown in Fig. 2, the casing 11 houses a lever 16 which is pivotally mounted on a shoulder screw bushing 17, the forward end 18 of the lever 16 extending outwardly from the casing through a slot 19 in the side thereof, see Fig. 4, and having an arcuate yarn guide shield 20 positioned at its end. Two rollers 21, 22 are rotatably mounted on the outer face of the shield in spaced horizontal alignment, and the shield 20 is provided with an intermediate vertical slot 23 between rollers 21, 22, see Fig. 1, for receiving a third roller 24, as hereinafter described.

The inner end 25 of the lever 16 is connected to the upper end 26 of a tension spring 27, which is preferably of the coil type, the lower end 28 of the spring being secured to a retainer stud 29 mounted in a hollow extension 30 of the casing 11, the extension 30 being shaped to form a hand grip. A trigger 31 is formed as a depending part of the lever 16, and is normally positioned so as to be engaged by the forefinger when the extension 30 is held in the hand; and the lever 16 has an arcuate flange 32 which extends rearwardly behind the trigger to close the slot 19 regardless of the position of the trigger. The spring 27 serves to turn the lever 16 to its upper position, and a stop projection 33 extends upwardly from the lever 16 to engage the lower end of a limit screw 34 which is adjustably threaded in the upper wall of the casing 11 to retain the lever 16 in its upper, tension measuring position.

Referring now to Fig. 3, the indicating mechanism is mounted on the inner face of the cover 12, and includes a lever 35 which is pivotally mounted on a pin 36 locked between the cover and a removable support plate 37. The forward end 38 of the lever 35 extends through a slot 39, see Fig. 4, in the side of the casing 11 which is aligned with the shield slot 23, and carries the roller 24 in intermediate relation to the spaced rollers 21, 22. The rear portion 40 of the lever 35 is balanced, as by cutting out as indicated at 41, or by loading if necessary, and its end is arcuately shaped and gear-cut as shown in Fig. 6 to form an arcuate gear rack 42 which meshes with a gear 43 rotatably mounted between the cover and a plate 44 and connected to the pointer 15, see Fig. 1, the plate 44 being mounted in spaced relation to the cover. Two limit stops 45, 46 are mounted on the cover to limit turning movement of the lever 35.

The lever 35 and its roller 24 are normally held in down position, as illustrated in Fig. 3, by an adjustable tensioning mechanism comprising a flat spring 47 which is locked at one end 48 by a screw 49, the screw passing through a suitable opening or slot in the flat spring and being threaded in a boss 50 extending from the inner surface of the cover; the other end 51 of the spring is up-curved and passes through an eye 52 of a hook strap 53 which engages a stud 54 on the lever 35. A slotted plate 55 is adjustably secured to the cover by means of a screw 56, and has a projecting stud 57 which adjustably engages the flat spring 47 to provide a desired spring tension.

The roller mounting for the rollers 21, 22 and 24 is preferably similar, and is illustrated in Fig. 5, which shows the mounting for roller 21. The roller 21 is V-cut as indicated at 58, and has a cylindrical bore 57 with an inner cylindrical liner 60, the forward end of the bore 59 being enlarged to receive the head 61 of a bearing screw 62, which is cut away as indicated at 63 to provide two annular bearing shoulders 64 for the liner 60, the inner end 65 of the bearing screw being reduced and threaded into a correspondingly threaded opening 66 in the shield 20. The outer surface of the shield 20 is preferably recessed as indicated at 67 to extend over the inner edge of the V-cut.

Operation of the tension meter

When it is desired to measure the tension of a yarn, thread, cord, or wire, the instrument is held in the hand as shown in Fig. 1, with the fingers grasping the casing extension 30 and the forefinger holding the trigger 31. In this position the roller 24 is at the bottom of the shield slot 23 and the two rollers 21, 22 are at their upper positions and aligned with the roller 24. The trigger 31 is now pulled, and the shield 20 and the rollers 21, 22 are drawn down against the tension of the spring 27 to provide a clearance between the roller 24 and the two rollers 21, 22, whereupon the instrument may be placed to position a linear element A, such as a yarn, cord or wire, in the clearance between roller 24 and rollers 21, 22 and against the shield 20. The trigger is now released; the rollers 21, 22 move upwardly until movement of the lever 16 is stopped by limit screw 34, and the linear element A contacts the rollers and assumes the position shown in Fig. 1 to exert an upward thrust on the roller 24, thus turning the gear 43 and the pointer 15 against the yielding resistance of the flat spring 47. The tension in the linear element A is thus directly read on the indicia 14.

Operational characteristics

The instrument may be constructed to indicate tension directly, the size and setting of the flat spring 47 being determined to obtain a reading within the desired range for a given material. Thus, the instrument may be designed for a desired total capacity, for example, to read up to 100 grams, or to read to a greater capacity, for example, 500 grams, depending on the linear material which is to be tested. The lever 35 being balanced, its movement is proportional to the tangent of the angle of deflection of the linear element; for angles of deflection from zero to ten degrees the tangent varies as to the angle, and the lever turns in exact proportion to the tension, the angle of deflection being practically identical along the linear element regardless of the place of measurement.

The novel construction thus provides a multiplied movement of the pointer in exact correspondence to the tension of the yarn, cord, or wire, and the reduction of internal friction to a minimum ensures an instant response of the indicating pointer to the tension effect.

The size of the rollers and the distance between the rollers are preferably fixed to obtain the desired low deflection, taking into consideration the diameter or width of the linear element, and the guide shield and roller insets ensure a positive positioning of the linear material in the roller grooves. The parts are preferably all metal or plastic, and the material contact parts are preferably chromium-plated or plastic, thus minimizing wear and affording protection against acids. The provision of the slot closure flange 32 keeps acids, dust, lint and other extraneous material out of the operating parts and thus maintains accuracy of the tension readings.

Modified tensioning arrangements

Although the preferred tension control mechanism includes a flat spring element, it may be desirable to use other types of spring elements for yarns, cords and the like which are subjected to different tensions. The construction of tension meter shown in Figs. 1 to 6 is readily modified for such purposes.

Thus, Fig. 7 illustrates a spring coil type tension control mounted on the inner surface of a meter cover 68, the balanced lever 69 being pivoted on a pin 70 mounted between the cover and a plate 71 secured in spaced relation to the cover, the balanced tension lever having a roller 72 at the outer end and being formed as an arcuate rack 73 at the inner end to engage a pointer gear 74 which is rotatably mounted between the cover and a support plate 75 secured in spaced relation to the cover.

A plate 76 having an adjusting slot 77 is adjustably secured to the cover by a screw 78, and has one end of a coil spring 79 rotatably secured thereto, the other end of the coil spring being rotatively secured to a stud screw 80 threaded into the lever 69. Limit stops 81 and 82 are provided to limit the swinging movement of the lever 69.

Figure 8:
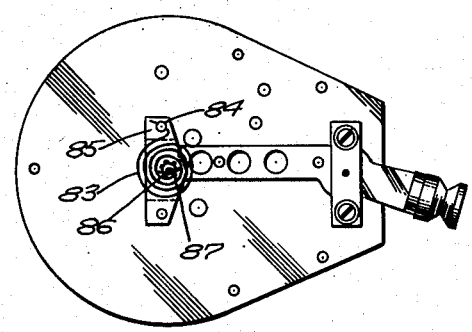
Fig. 8 is a view similar to Fig. 3, showing a different modification of meter operating mechanism.

This construction reduces the number of parts required, and is suitable for a lower pressure range than the construction of Fig. 1. If a very low pressure range is desired, it is feasible to use the construction of Fig. 8, in which the coil spring control of Fig. 7 is replaced by a watch spring coil, preferably made of beryllium copper, the watch spring 83 having its outer end secured to a rivet 84 at one end of the gear support plate 85, and its inner end secured to the shaft 86 of the pointer gear 87, the other parts being identical with those shown in Fig. 7. This construction permits a relatively large pointer movement for small values of the thread or cord tension. The spiral spring has the advantage that it takes up back-lash.

Figure 9:
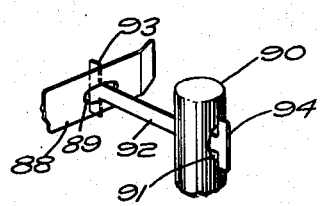
Fig. 9 is a perspective detail of an interlocking arrangement of low friction.

If it is desired to decrease friction and increase the speed of response of the indicating parts of the construction of Fig. 1, the back strap may be knife-edge connected to the flat spring and the lever as shown in Fig. 9, wherein the flat spring 88 has an end opening 89, the lever has a stud 90 with an opening 91, and the strap is in the form of an I strip 92, having one end cross bar 93 transverse to and in edge contact with the upper surface of the flat spring and the other end cross bar 94 in edge contact with the surface of the stud 90.

*Heavy duty constructions*

The arrangements illustrated in Figs. 1 to 9 are particularly suitable for the measurements of relatively low tensions, as the spring controls for the operating lever permit a relatively large movement of the operating lever for the smaller tensions, up to, for example, 500 grams. When the tension meter is designed to measure the tension of heavy cords or wires, there is relatively slight movement of the operating lever roller, and it becomes advisable to increase the multiplying effect of the lever movement and/or to change the arrangement of the spring control.

Figs. 10 to 13 inclusive disclose a preferred arrangement for obtaining an increased multiplication of the movement of the operating lever roller. The tension meter 95 includes a casing 96 of the type disclosed in the previous figures, the casing being provided with an extension 97 similar to the extension 30 of Fig. 1, and generally similar operating parts, including a cover 98, a movable guide shield 99 having a trigger control 100, and spaced guide shield rollers 101, an operating lever roller 102 being positioned intermediate the spaced rollers 101 in a guide shield slot, substantially as heretofore described.

The operating lever roller 102 is positioned at the forward end of an operating lever 103, which is pivoted on a pin 104 mounted between the mover 98 and a bearing plate 105 which is detachably secured in spaced relation to the cover. The inner end 106 of the operating lever 103 is formed as an arcuate rack 107 which meshes with a gear 108 mounted on a shaft 109, secured between the cover 98 and a bearing plate 110 detachably mounted in spaced relation to the cover plate by means of screws 111. A second larger gear 112 is also mounted on the shaft 109 and meshes with a gear 113 rotatably mounted on a pin 114 between the cover and the plate 110, the gear 113 meshing with a large gear 115 which is pivotally mounted on a shaft 116 positioned between the cover and the plate 110; the indicating pointer 117 on the upper or face side of the cover 98 is mounted on the end of the pin 114. The movement of the operating lever 103 is thus greatly multiplied, and a small displacement of the operating lever 102 provides a relatively large movement for the indicating pointer 117, which cooperates with the tension indicia 118 on the face side of the cover.

It is preferred to increase the accuracy of the observed tension by providing a small clock spring 119, see Fig. 13, having its inner end secured to the shaft 116 and its outer end secured in a stud 120 fixed to the cover, to eliminate all back-lash of the multiplying gear mechanism.

The spring arrangement for properly tensioning the operating lever 103 is similar to the spring tension mechanism shown in the modification of Fig. 1, and includes a flat spring 121 secured at one end 122 to a set screw 123 which is mounted in an upstanding boss 124 of the cover 98, the other end 125 extending upwardly to receive the upper end of a strap hook 126, the lower end of which engages a stud 127 secured to the operating lever 103. A tension regulator plate 128 is also provided, having a slot 129 through which an adjusting screw 130 passes to lock the adjusting plate 128 to the cover 98, the regulator plate having an upstanding boss 131 which may be set to bear against the flat spring 121 for controlling its tension. Limit stops 132, 133, similar to the limit stops heretofore described, are provided for the operating lever 103.

The above construction provides a multiplying mechanism for obtaining an increased movement of the indicating pointer for higher tension. Since it may be desirable to provide a visual indication of permissible maximum and minimum tensile stresses for the linear material being tested, the glass dial 134 of the indicating mechanism is provided with a bushing 135 having a knurled edge 136 for imparting rotation, the inner end of the bushing having a pointer 137 so that it may be set for a particular limit value. The bushing also carries a shaft 138, the upper end 139 of which is also knurled for movement the lower end of the shaft 138 having a pointer 140 secured thereto for indicating the other limiting tensile requirement, and the shaft 138 being recessed to receive a bearing liner 141 which is seated within the bushing 135. The two pointers 137, 140 are therefore easily set by hand to indicate a maximum and a minimum tension, this indication being particularly desirable in measuring the tensile stress of such liner elements as yarn, rubber and lastex, cores of yarns, thin wires for galvanometer coils, headphones and magnet coils, incandescent lamps and radio tubes.

The above tension meter constructions are particularly suitable for portable devices, but the meter arrangements may be readily adapted for stationary use, and may, in known manner, be utilized for controlling yarn, cord, and wire forming machines and the like. Thus, referring to Fig. 14, the upper and lower limit pointers 137, 140 may be insulated so that contact of the tension indicator pointer 117 will energize relays 142, 143 in a control circuit 144 to control remote mechanism. For example, a wire forming apparatus (not shown) may have its power motor shut off in the event that either the lower or the upper limit is indicated; other controls such as magnetic controls, photo electric controls, tuning condenser devices, rotating rheostats, pilot valves and servo-motor mechanisms may be similarly controlled. When the tension meter is of the stationary type, the limit stops, such as 132 and 133, may be utilized for control purposes in place of the pointers, but the pointers are preferred because they are more easily set.

Figure 15:
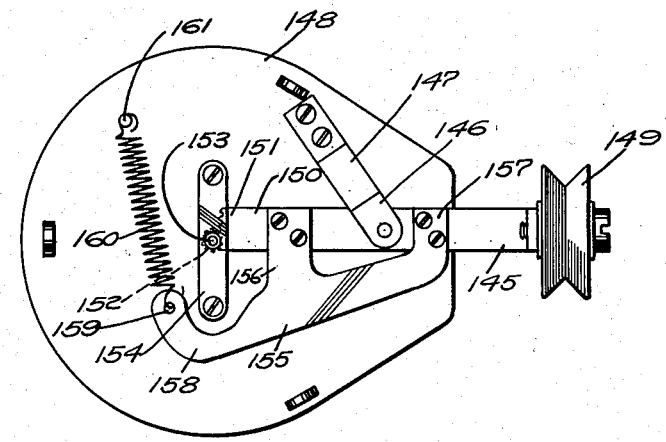
Fig. 15 is a view of the back cover of a still different heavy duty tension meter.

For certain heavy duty measurements, it is preferred to increase the spring lever on the operating lever, rather than use a multiplying arrangement. For such constructions, an illustrative embodiment is shown in Fig. 15, the operating lever 145 is pivotally mounted intermediate its ends to the lower end 146 of a strap 147, the upper end of the strap 147 being secured to the inner face of the cover 148. The V-shaped material engaging roller 149 is mounted on the forward, outwardly extending end of the operating lever 145, as hereinbefore described, and the rear end 150 of the operating lever 145 is formed as an arcuate rack 151 which engages with a pointer gear 152 mounted on a pin 153 secured between the cover and a bearing plate 154 which is attached to the cover in spaced relation thereto.

A bearing element 155 is mounted on the operating lever 145, preferably by means of spaced extensions 156, 157 which are attached to the operating lever on opposite sides of its pivot mounting, the rear portion 158 of the bearing element 155 being arculately shaped and pierced as indicated at 159 to receive the lower end of a coil spring 160, the upper end of the coil spring being secured to the cover 148 by means of a suitable stud 161. This construction provides a greatly increased spring tension so as to exert a stronger pull against the tensile pull of the linear material on the roller 149.

Figure 16:
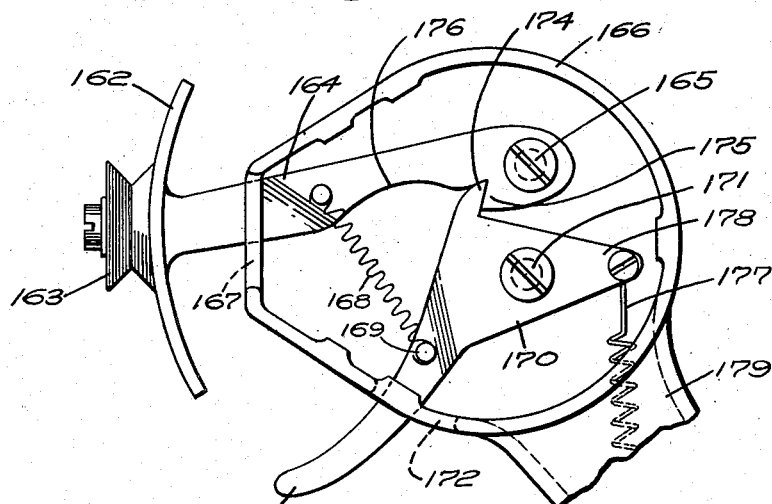
Fig. 16 is a view of the casing interior therefor.

It has also been found advantageous, for certain constructions, to provide a positive lock for arresting the guide shield and its spaced rollers, and to permit a certain amount of relative movement between the trigger and the remaining guide shield parts. This may be accomplished by a construction such as illustrated in Fig. 16, in which the guide shield 162, which carries the guide shield rollers 163, is mounted at the forward end of a lever 164, which is pivotally mounted as indicated at 165 to the casing 166, the forward end of the lever 164 projecting outwardly from the casing through a slot 167, as hereinbefore described.

A coil spring 168 is secured at one end to the lever 164 and is secured at its other end to a stud 169 mounted in the casing 166, to normally continually urge the lever 164 to lowered position. A trigger lever 170 is pivotally mounted as indicated at 171 within the casing 166, and has its forward end extending through a suitable slot 172 in the casing to provide a trigger finger 173, the rear portion of the trigger lever 170 being formed as a stop abutment or pawl 174 which had interlocking engagement with an oppositely directed pawl 175 formed at the rear end of the lever 164, and being rounded to cooperate with an arcuate abutment surface 176 formed on the intermediate portion of the lever 164, the trigger lever 170 being normally urged forwardly by a coil spring 177 which has one end attached to the rear end 179 of the lever 170 and the other end secured in the hollow extension 181.

With the arrangement shown, the guide shield and its rollers are normally locked in elevated position, and are released from this position upon pulling movement on the trigger finger 173, whereupon the pawl 174 seats within the arcuate portion 176 of the guide shield lever 164.

One advantageous feature of the above described meter constructions resides in the positioning of the three rollers at right angles to the plane of operating mechanism, thus simplifying the mechanism and facilitating its use. This feature is of particular advantage when the linear material is of strip or sheet form, instead of filamentous form, the parts being readily adaptable for this purpose.

Although I have described specific constructional embodiments of my invention, and have illustrated preferred arrangements of parts, particularly suitable for different operating conditions, it is obvious that changes in the size, shape and relative positioning of the parts, and in their relative functions and operations, may be made to suit the requirements for different tension meter needs, without departing from the spirit and the scope of the invention as defined in the appended claims.

I claim:

1. In a tension meter, a casing, a lever pivotally mounted in said casing, finger engageable means for rotating said lever, spring means resisting rotation of said lever, said lever having a portion extending from said casing, a shield mounted on said lever portion and carrying spaced aligned rollers, a tension lever pivotally mounted in said casing and having its outer end projecting from said casing, said outer end carrying a roller positioned intermediate said spaced aligned rollers, means yieldingly resisting rotation of said tension lever, means for multiplying the movement of the inner end of the tension lever, and means for indicating the multiplied movement.

2. In a portable tension meter for measuring the tension of a linear element, a casing, a member pivotally mounted in said casing, spring means pressing said pivoted member to fixed position, a second member movably mounted in said casing, said members having cooperating contact elements adapted to receive a linear element under tension therebetween, said pivoted member having a manually engageable trigger extending from said casing adapted to move said pivoted member from its fixed position against the tension of its spring means for facilitating receiving of the linear element therebetween, spring means yieldingly resisting movement of said movable member in accordance with the tension of the linear element, an indicator on said casing, and mechanism connecting the movable contact member to the indicator for indicating the tension responsive movement of the movable member.

3. In a portable tension meter for measuring the tension of a linear element, a casing, a member pivotally mounted in said casing, spring means pressing said pivoted member to fixed position, a second member movably mounted in said casing, said members having cooperating contact elements adapted to engage a linear element under tension therebetween, said casing having a slot and said pivoted member having a manually engageable trigger extending from said slot for moving the pivoted member from its fixed position to facilitate insertion of the linear element, spring means yieldingly resisting movement of said movable member in accordance with tension of the linear element, an indicator on said casing, and mechanism connecting the movable member to the indicator for indicating the tension responsive movement of the movable member.

4. In a portable tension meter for measuring the tension of a linear element, a casing, a member pivotally mounted in said casing, spring means pressing said pivoted member to fixed position, a second member movably mounted in said casing, said members having cooperating contact elements adapted to engage a linear element under tension therebetween, said casing having a slot and said pivoted member having a manually engageable trigger extending from said slot for moving the pivoted member from its fixed position to facilitate insertion of the linear element, and a guard in said casing extending over and sealing said slot, spring means yieldingly resisting movement of said movable member in accordance with tension of the linear element, an indicator on said casing, and mechanism connecting the movable contact member to the indicator for indicating the tension responsive movement of the movable member.

5. In a portable tension meter for measuring the tension of a linear element, a casing, a member pivotally mounted in said casing, spring means pressing said pivoted member to fixed position, a second member movably mounted in said casing, said members having cooperating contact elements adapted to engage a linear element under tension therebetween, said pivoted member having a manually engageable trigger extending from said casing and adapted to move said pivoted member from its fixed position against the tension of the spring means to facilitate insertion of the linear member, second spring means yieldingly resisting movement of said movable member in accordance with tension of the linear element, said second spring means including a flat spring, an indicator on said casing, and mechanism connecting the movable member to the indicator for indicating the tension responsive movement of the movable member.

6. In a portable tension meter for measuring the tension of a linear element, a casing, a member pivotally mounted in said casing, spring means pressing said pivoted member to fixed position, a second member movably mounted in said casing, said members having cooperating contact elements adapted to engage a linear element under tension therebetween, said pivoted member having a manually engageable trigger extending from said casing and adapted to move said pivoted member from its fixed position against the tension of the spring means to facilitate insertion of the linear element, said contact elements including freely rotatable V-shaped pulleys, spring means yieldingly resisting movement of said movable member in accordance with tension of the linear element, an indicator on said casing, and mechanism connecting the movable member to the indicator for indicating the tension responsive movement of the movable member.

7. In a portable tension meter, a casing, a member pivotally mounted in said casing and having a guide plate with a slot, said guide plate having spaced contact elements on opposite sides of said slot, spring means urging said pivoted member to fixed position, a member movably mounted in said casing and having a contact element positioned in said slot and normally in alignment with the contact elements of the guide plate, whereby a linear element under tension may be positioned between said guide plate contact elements and said movable member contact element, a manually engageable finger on said pivoted member extending from the casing for moving said pivoted member against the tension of its spring means to facilitate insertion of the linear element, spring means yieldingly resisting movement of said movable member in accordance with tension of the linear element, an indicator on said casing, and mechanism connecting the movable member to the indicator for indicating the tension responsive movement of the movable member.

8. In a portable tension meter, a casing, a member pivotally mounted in said casing and having a guide plate with a slot, said guide plate having spaced contact elements on opposite sides of said slot, spring means urging said pivoted member to fixed position, a member movably mounted in said casing and having a contact element positioned in said slot and normally in alignment with the contact elements of the guide plate, whereby a linear element under tension may be positioned between said guide plate contact elements and said movable member contact element, said casing having a slot, a manually engageable finger on said pivoted member extending from the casing slot for moving said pivoted member against the tension of its spring means to facilitate insertion of the linear element, spring means yieldingly resisting movement of said movable member in accordance with tension of the linear element, an indicator on said casing, and mechanism connecting the movable member to the indicator for indicating the tension responsive movement of the movable member.

9. In a portable tension meter, a casing, a member pivotally mounted in said casing and having a guide plate with a slot, said guide plate having spaced contact elements on opposite sides of said slot, spring means urging said pivoted member to fixed position, a member movably mounted in said casing and having a contact element positioned in said slot and normally in alignment with the contact elements of the guide plate, whereby a linear element under tension may be positioned between said guide plate contact elements and said movable member contact element, said casing having a slot, a manually engageable finger on said pivoted member extending from the casing slot for moving said pivoted member against the tension of its spring means to facilitate insertion of the linear element, a guard in said casing extending over the casing slot, spring means yieldingly resisting movement of said movable member in accordance with tension of the linear element, an indicator on said casing, and mechanism connecting the movable member to the indicator for indicating the tension responsive movement of the movable member.

10. In a portable tension meter, a casing, a member pivotally mounted in said casing and having a guide plate with a slot, said guide plate having spaced contact elements on opposite sides of said slot, spring means urging said pivoted member to fixed position, a member movably mounted in said casing and having a contact element positioned in said slot and normally in alignment with the contact elements of the guide plate, whereby a linear element under tension may be positioned between said guide plate contact elements and said movable member contact element, a manually engageable finger on said pivoted member extending from the casing for moving said pivoted member against the tension of its spring means to facilitate insertion of the linear element, spring means comprising a flat spring and yieldingly resisting movement of said movable member in accordance with tension of the linear element, an indicator on said casing, and mechanism connecting the movable member to the indicator for indicating the tension responsive movement of the movable member.

11. In a portable tension meter, a casing, a member pivotally mounted in said casing and having a guide plate with a slot, said guide plate having spaced contact elements on opposite sides of said slot, spring means urging said pivoted member to fixed position, a member movably mounted in said casing and having a contact element positioned in said slot and normally in alignment with the contact elements of the guide plate, whereby a linear element under tension may be positioned between said guide plate contact elements and said movable member contact element, a manually engageable finger on said pivoted member extending from the casing for moving said pivoted member against the tension of its spring means to facilitate insertion of the linear element, said contact elements including freely rotatable V-shaped pulleys, spring means yieldingly resisting movement of said movable member in accordance with tension of the linear element, an indicator on said casing, and mechanism connecting the movable member to the indicator for indicating the tension responsive movement of the movable member.

ERWIN J. SAXL.

REFERENCES CITED

The following references are of record in the file of this patent:

UNITED STATES PATENTS

| Number | Name | Date |
|---|---|---|
| 816,196 | Tuttle | Mar. 27, 1906 |
| 1,211,820 | Burbank | Jan. 9, 1917 |
| 1,647,287 | Floyd | Nov. 1, 1927 |
| 1,757,867 | Lewellen | May 6, 1930 |
| 1,838,299 | Cook | Dec. 29, 1931 |

FOREIGN PATENTS

| Number | Country | Date |
|---|---|---|
| 199,152 | Great Britain | June 20, 1923 |